Aug. 13, 1968  H. A. ROSEN ETAL  3,396,920
APPARATUS FOR CHANGING THE ORIENTATION AND VELOCITY
OF A SPINNING BODY TRAVERSING A PATH
Filed Dec. 30, 1959  6 Sheets-Sheet 1
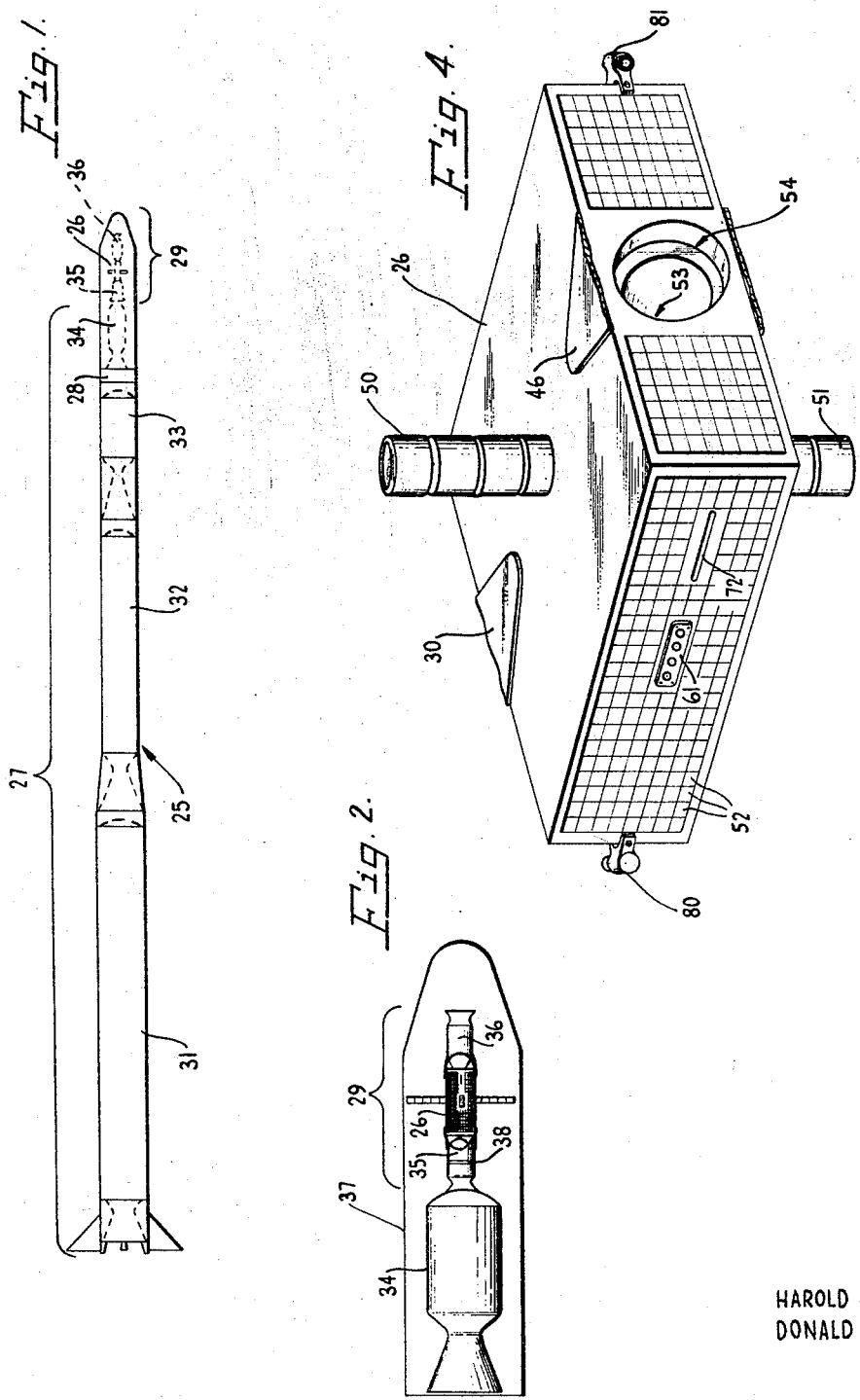
HAROLD A. ROSEN,
DONALD D. WILLIAMS,
INVENTORS
BY Noel B. Hammond
AGENT

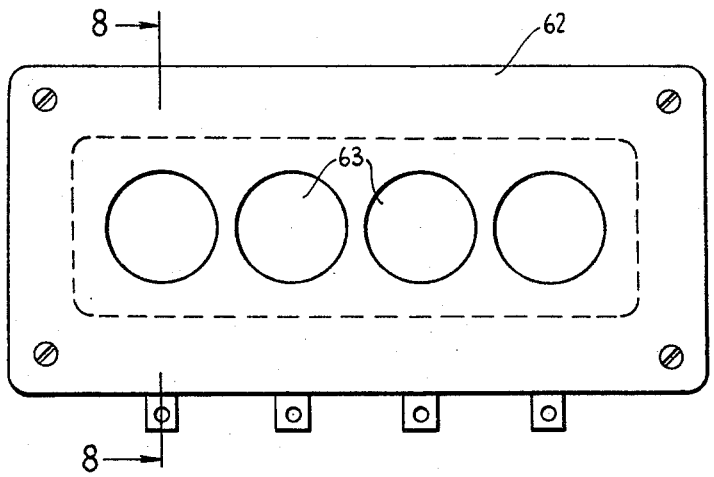
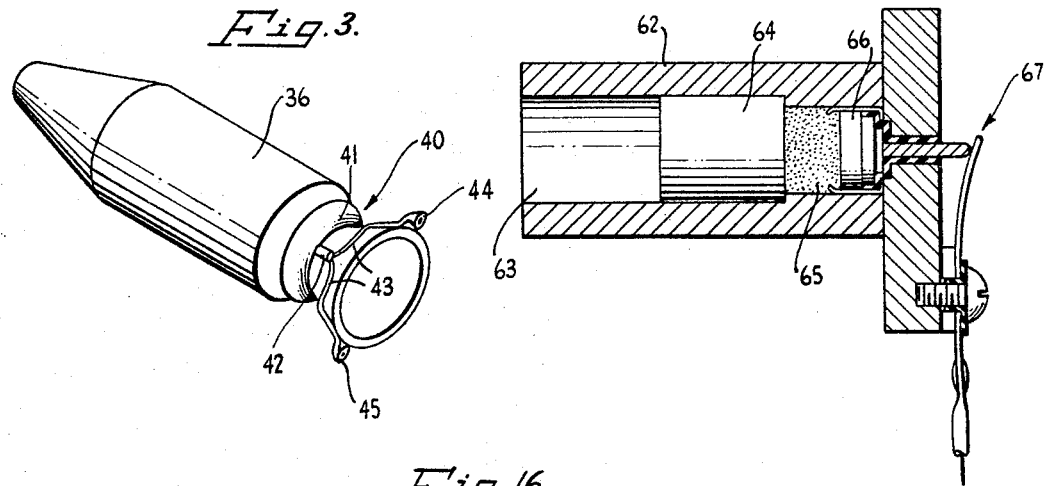
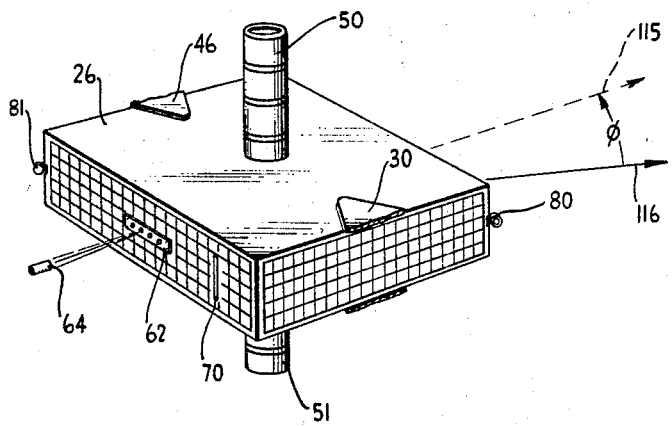

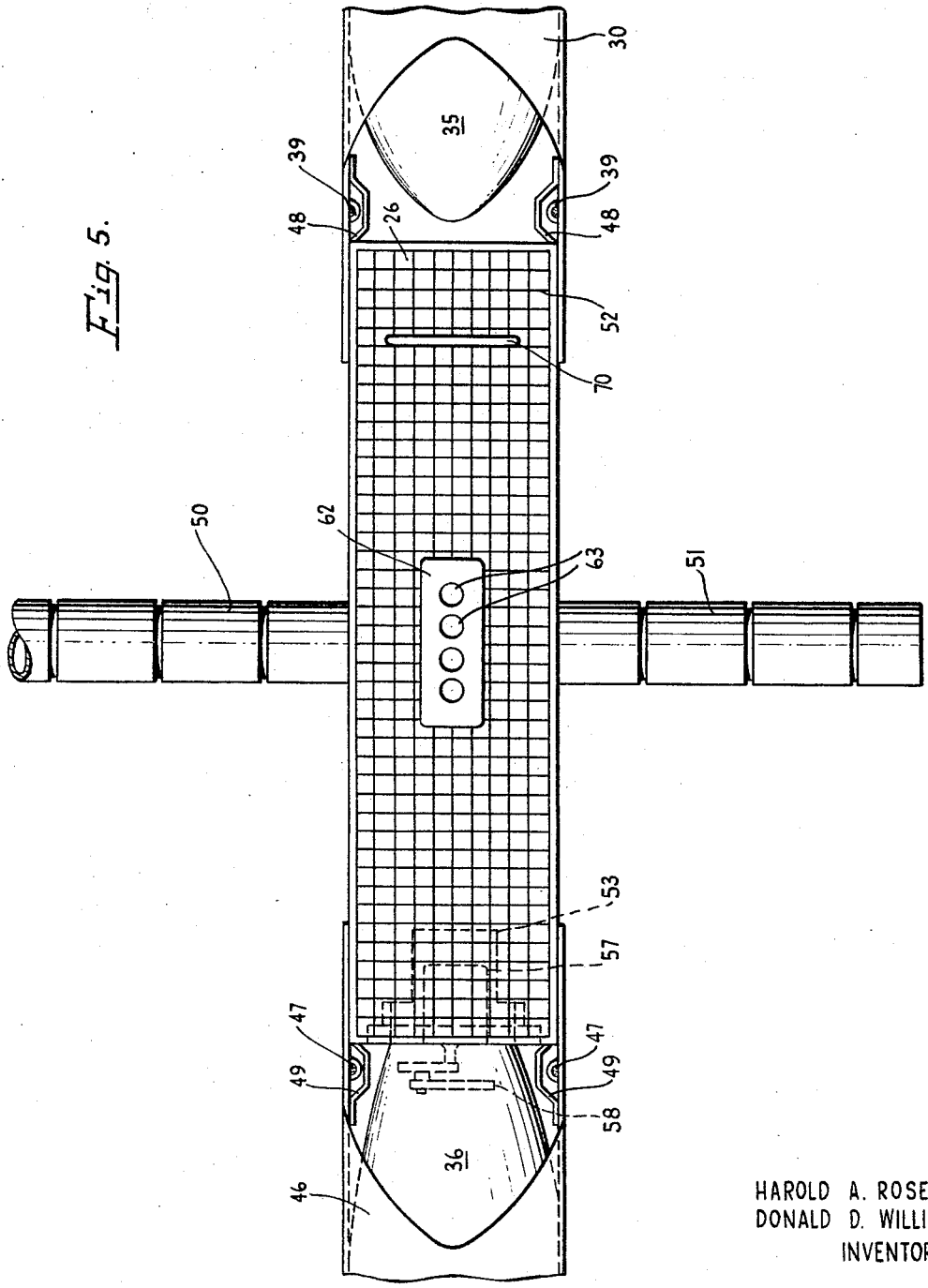

HAROLD A. ROSEN,
DONALD D. WILLIAMS,
INVENTORS

BY *Noel B. Hammond*
AGENT

HAROLD A. ROSEN,
DONALD D. WILLIAMS,
INVENTORS

BY Noel C. Hammond
AGENT

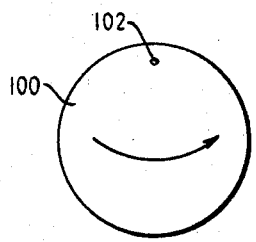
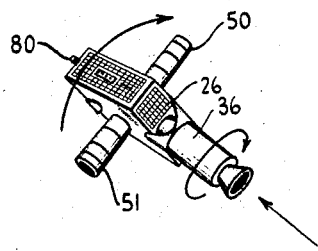
Fig. 12.
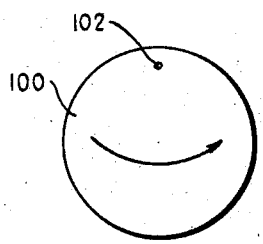
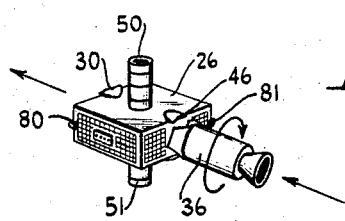
Fig. 13.
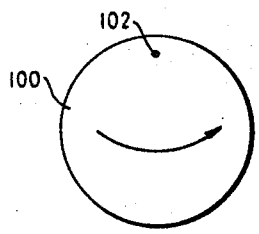
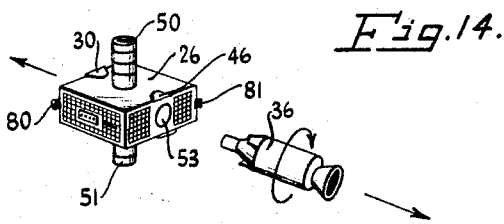
Fig. 14.
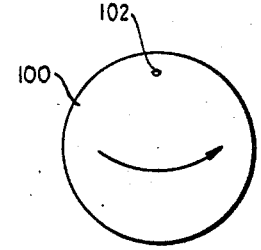
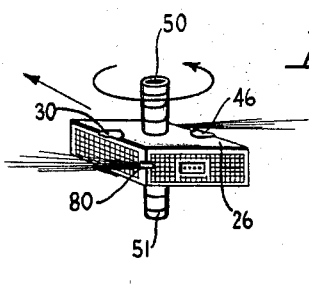
Fig. 15

United States Patent Office 3,396,920
Patented Aug. 13, 1968

3,396,920
APPARATUS FOR CHANGING THE ORIENTATION AND VELOCITY OF A SPINNING BODY TRAVERSING A PATH
Harold A. Rosen, Santa Monica, and Donald D. Williams, Inglewood, Calif., granted to National Aeronautics and Space Administration under the provisions of 42 U.S.C. 2457(d)
Filed Dec. 30, 1959, Ser. No. 862,921
2 Claims. (Cl. 244—1)

The present invention relates to space vehicles such as satellites and, more particularly, to a method and apparatus for spinning a satellite about a particular axis having a predetermined orientation with respect to the earth after the satellite has reached a selected orbit.

Man-made satellites placed into orbit around the earth are often provided with equipment requiring the satellites to be accurately placed into specific orbits and to be oriented in a predetermined manner. For example, a satellite for use as a radio communication relay may have to be accurately placed into a west-to-east circular orbit in the plane of the earth's equator and having a period of 24 hours. Such an orbit is desirable because the satellite hovers above a single point on the earth, inasmuch as both the satellite and the earth have the same angular velocity. A satellite which hovers above a single point on the earth must be accurately placed into an orbit having a 22,750 nautical mile radius from the center of the earth and the satellite must travel around the orbit with a linear velocity of 10,090 feet per second.

An active communication satellite, that is, one which is equipped to receive and retransmit radio waves, is provided with an antenna and may be provided with solar cells as a source of power. To increase the antenna gain, the satellite should be spinning about the antenna axis and this axis should be parallel to the earth's axis. In this way, the antenna radiation pattern may be omnidirectional about the antenna axis but have a narrow beam width about a plane extending through the center of the satellite perpendicular to the antenna axis. This system provides increased antenna gain, 8 decibels, for example, in the direction of the earth and permits the use of a radio transmitter having a relatively low power output, thus reducing size and weight requirements. Further, solar cells need be placed only on those surfaces of the satellite that intercept maximum light from the sun.

It may be found that the satellite drifts relative to a precise stationary orbit and requires correction over a period of time. The possible drift due to errors in the velocity of the satellite has been determined to be 39.4 degrees per year per foot per second of velocity error.

To keep the cost of the satellite and the launching rocket as low as possible, the satellite and its apparatus for orientation and stabilization should be simple in operation, light in weight, and small in size.

Accordingly, it is an object of the present invention to provide apparatus for orienting a spin-stabilized vehicle such as a satellite in a predetermined orbit in space.

Another object of the invention is the provision of apparatus for correcting the orbit of a spin-stabilized vehicle such as a satellite.

Another object of the invention is the provision of apparatus for stopping the spin of a space vehicle such as a satellite about a first axis and spinning the vehicle about a new axis perpendicular to the first axis.

Yet another object of the present invention is to provide increased antenna gain in a spinning vehicle such as a space satellite.

A further object of the invention is the provision of optimum solar cell illumination in an orbiting space satellite.

Still another object of the present invention is to provide apparatus for orienting a spin-stabilized satellite which is simple in form, reliable in operation, small in size, light in weight, inexpensive, and low in power consumption.

In accordance with these and other objects of the invention, an orbiting satellite having a radio antenna and solar cells is oriented with respect to the earth and the sun to optimize the satellite antenna gain and the solar cell illumination. The satellite enters its orbit spinning about a first axis extending through an attached rocket case. The desired spin axis is perpendicular to the first spin axis. Means is provided for stopping the spin of the satellite about the first axis by rotating the satellite with respect to the rocket case. Means is provided for sensing the orientation of the satellite relative to the earth, the sun, or both.

Knowing the orientation of the satellite, the instant that the satellite has ceased to spin about the first spin axis can be determined and also the orientation of the desired new spin axis with respect to the earth's axis can be sensed. At the instant that the satellite has ceased to spin about the first axis and the desired new spin axis is simultaneously parallel to the earth's axis, the rocket case is separated from the satellite. Means is provided to spin the satellite about the new axis after separation of the rocket case from the satellite.

Deviations from the correct orbital period, eccentricity and phase are determined from observations made from the earth. Means is provided to correct orbital deviations by applying a reaction force to the satellite with a predetermined momentum and in the proper direction.

The following specification and the accompanying drawings describe and illustrate an exemplification of the present invention. Consideration of the specification and the drawings will provide a complete understanding of the invention, including the novel features and objects thereof. Like reference characters are used to designate like parts throughout the figures of the drawings.

FIG. 1 is a view in elevation of an exemplary embodiment of a satellite launching vehicle in accordance with the invention showing the relationship of the propulsion rockets to the satellite;

FIG. 2 is an enlarged elevational view of a portion of the launching vehicle of FIG. 1 showing the relationship of fourth, fifth, and sixth stage rockets to the satellite and enclosing heat shield;

FIG. 3 is an isometric view of the sixth stage rocket showing the arrangement of a vernier propulsion system;

FIG. 4 is a perspective view of the satellite showing the arrangement of various mechanical features thereof;

FIG. 5 is an elevational view partly in section of a portion of the fifth and sixth stage rockets and the satellite showing yokes which fasten the rockets to the satellite and an arrangement for severing the yokes;

FIG. 7 is an elevational view of an orbital correction gun;

FIG. 8 is a cross-sectional view of the orbital correction gun of FIG. 7 taken on the line 8—8 of FIG. 7;

FIG. 12 is a diagram indicating the initial spin of the satellite and the sixth stage rocket about the rocket axis;

FIG. 13 is a diagram indicating the alignment of the antenna axis of the satellite parallel to the earth's axis while the sixth stage rocket continues to rotate;

FIG. 14 is a diagram illustrating the separation of the sixth stage rocket from the satellite;

FIG. 15 is a diagram indicating the final spin of the satellite about the antenna axis parallel to the earth's axis; and FIG. 16 is a diagram showing the application of a reaction force to the satellite in a predetermined direction.

Figures 6, 11:
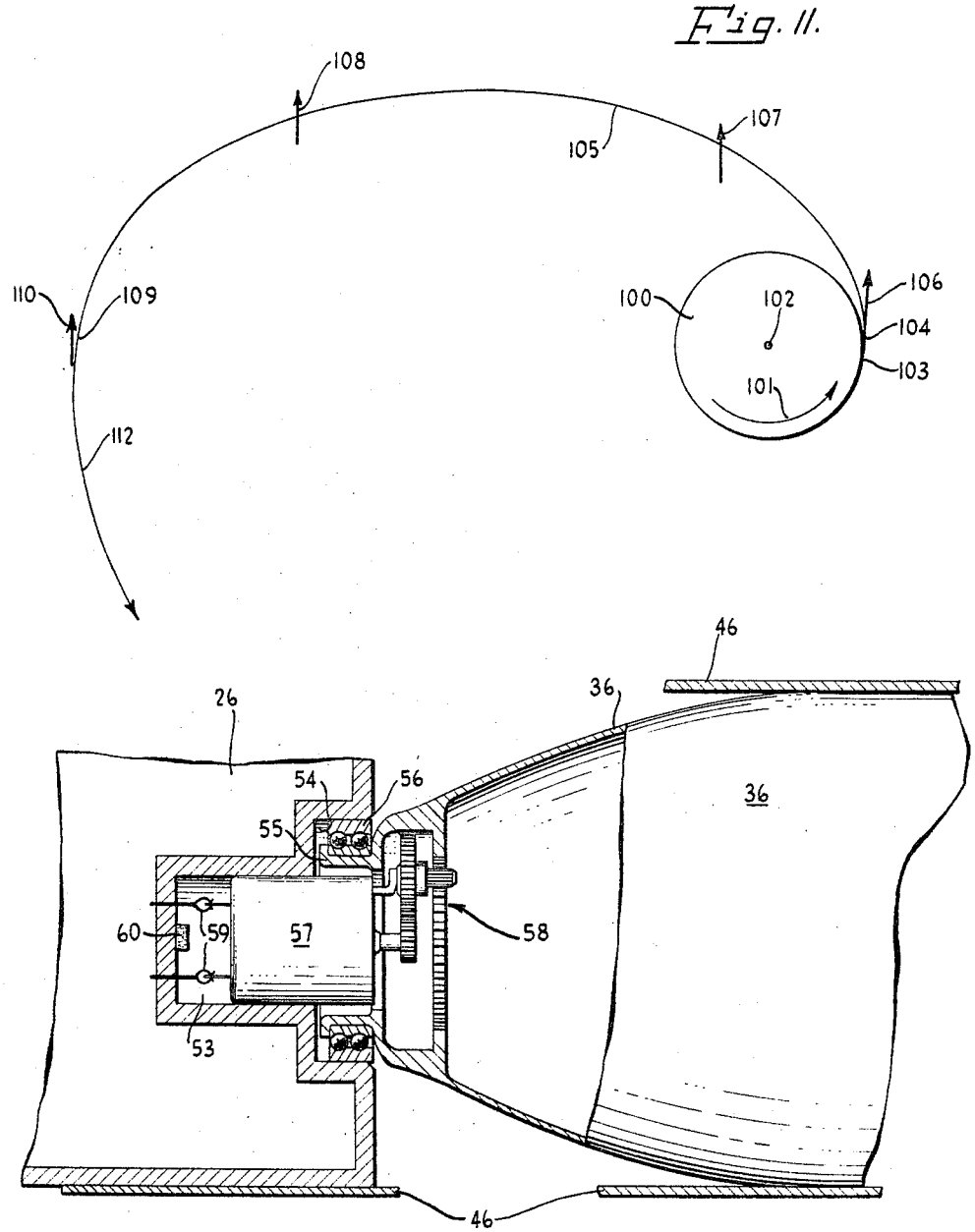
FIG. 6 is a sectional view of a portion of the satellite and the sixth stage rocket case showing a de-spin and separation arrangement.
FIG. 11 is a diagram of a satellite trajectory from the earth to a desired orbit.

Although the present invention does not embrace a vehicle for conveying a satellite to an orbit, a brief description of a representative rocket vehicle useful for this purpose is included. Reference is hereby made to the book "Rocket Encyclopedia Illustrated," edited by J. W. Herrick and E. Burgess, Aero Publishers, Inc., Los Angeles, Calif., 1959, and to the bibliography therein for details of rocket vehicles and definitions of terms.

There is shown in FIG. 1 an exemplary embodiment of a rocket vehicle, indicated generally by the numeral 25, for accurately launching a space vehicle such as satellite 26 into a predetermined orbit around the earth. In the present example, the orbit in which the satellite 26 is to be placed is a so-called stationary orbit, which is a circular west-to-east equatorial orbit having a period of 24 hours. This orbit has a radius of 22,750 nautical miles from the center of the earth and the satellite 26 travels at a velocity of 10,090 feet per second (f.p.s.) in the direction of the earth's rotation and appears to stand still or hover over one point on the earth's surface. The satellite 26 may then be used, for example, to relay radio communications over long distances.

The primary or booster portion of the rocket vehicle 25 is a multistage rocket power plant designated by the numeral 27 in FIG. 1 and comprising first, second, third, and fourth stage rockets 31, 32, 33, and 34, respectively, arranged in tandem. Although liquid propellant rocket engines may be used, the use of solid propellant rocket engines for the multistage rocket power plant 27 results in a simpler, less expensive, and more reliable rocket vehicle 25. The first, second, and third stage rockets 31, 32, and 33 are provided with guidance means such as jet vanes (not shown) which are disposed in the jet stream from the rocket exhaust nozzle to deflect the jet and thus obtain a turning force to control the direction and attitude of the vehicle 25. Such an arrangement is shown on page 248 of the above-referenced Rocket Encyclopedia. The fourth stage rocket 34 is provided with means such as spin nozzles or spin rockets (not shown) to rotate the fourth stage rocket 34 about its longitudinal axis for stabilization. Such arrangements are shown and described on pages 456 and 457 of the Rocket Encyclopedia. The ignition of the rocket engines, jettisoning of burned out rockets, guidance, and spin stabilization of the multistage rocket power plant 27 is automatically controlled by a guidance unit 28, which may be one of several types of programming and control systems that are well known in the art of rocketry.

If desired, the multistage rocket power plant 27 may be, for example, the "Scout" rocket developed for the National Aeronautics and Space Agency by Vought Astronautics Division of Chance Vought Aircraft, Inc., Dallas, Tex. Reference is made to the publication entitled "Space Research Vehicle Systems" developed from NASA Scout, publication number E9R–12402, dated August 1959 and published by Chance Vought Aircraft, Inc. for details of the Scout rocket. In particular, on page 23 of the Chance Vought publication, there is a description of a guidance system developed by the Minneapolis-Honeywell Regulator Co. which may be used as the guidance unit 28 in the present rocket vehicle 25.

The multistage rocket power plant 27 propels a gross payload 29, which may weigh on the order of 100 pounds, for example, to a point near the perigee of the transfer ellipse, that is, near the lowest point of the elliptical trajectory from the outer atmosphere of the earth to the desired orbit. The gross payload 29, best seen in FIGS. 1 and 2, comprises a fifth stage rocket 35, a sixth stage rocket 36 and the satellite 26. The gross payload 29 and the fourth stage rocket 34 are covered by a nose shell or cylindrical heat shield 37 until the launching vehicle 25 leaves the earth's atmosphere. The heat shield 37 is then automatically separated from the gross payload 29 and the fourth stage rocket 34. The construction and method of separation of a typical nose shell is illustrated on page 6 of the Chance Vought publication.

The fifth stage solid-propellant rocket 35, which is secured in tandem to the fourth stage rocket 34, provides the additional thrust required for the satellite 26 to reach the perigee of the transfer ellipse. The fifth stage rocket 35 is provided with means, such as an electrically fused annular explosive charge 38 (FIG. 2) which encircles the case of the fifth stage rocket 35, for reducing the thrust to zero. When detonated, the explosive charge 38 ruptures the combustion chamber of the fifth stage rocket 35.

The sixth stage rocket 36 provides the additional thrust to establish the satellite 26 in the circular orbit from the apogee or highest point of the transfer ellipse. The sixth stage rocket 36 is secured to the satellite 26 on the side opposite the side to which the fifth stage rocket 35 is secured, and is oriented in the opposite direction. That is, the fifth stage rocket 35 is oriented so that the rocket exhaust nozzle extends out from the satellite 26 in the opposite direction from that in which the exhaust nozzle of the fifth stage rocket 35 extends out from the satellite 26. As will be fully apparent hereinafter, this is necessary so that the thrust of the sixth stage rocket 36 will be applied in the correct direction.

The sixth stage rocket 36 establishes the satellite 26 in only an approximate 24-hour orbit and any velocity error causes the satellite 26 to drift from a stationary position above a point on the earth. Accordingly, a vernier propulsion system 40 is provided to establish a more accurate 24-hour period and, as shown in FIG. 3, the vernier propulsion system 40 includes a toroidal bottle 41 containing compressed nitrogen gas, which encircles the neck of the sixth stage rocket 36. An electrically operated valve 42 is connected by tubing 43 between the outlet of the bottle 41 and a pair of exhaust nozzles 44 and 45 on diametrically opposite sides of the main exhaust nozzle of the sixth stage rocket 36. Thus, gas is supplied simultaneously to both nozzles 44 and 45 when the valve 42 is actuated, to supply additional thrust in controlled amounts.

As may best be seen in FIG. 4, the satellite 26 has a rectangular box-like configuration, the dimensions of which may be 9 x 24 x 24 inches, for example, and the satellite 26 may weigh on the order of 20 pounds, for example. A pair of antenna elements 50 and 51 extend outwardly from the opposite faces of the satellite 26 having the largest area along an axis extending through the center of the satellite 26 perpendicular to the longitudinal axis of the rocket vehicle 25. The antenna elements 50 and 51 provide a radiation pattern that is substantially omnidirectional about the antenna axis, but has a narrow beam width about a plane extending through the center of the satellite 26 perpendicular to the antenna axis. The four sides of the satellite 26 parallel to the antenna axis are provided with solar cells, indicated by the numeral 52, for converting sunlight into electrical energy. The rectangular configuration of the satellite 26 has been selected to provide an optimum area of solar cells 52 exposed to the sun during spin about the axis of the antenna elements 50 and 51 and still provide suitable orientation of the satellite 26 in the heat shield 37 of the gross payload 29.

As shown in FIG. 5, the fifth and sixth stage rockets 35 and 36 are secured to the satellite 26 by means of tubular yokes 30 and 46 extending from the cases of the rockets 35 and 36, respectively, which are joined to the surfaces of the satellite 26 from which the antenna elements 50 and 51 extend. Explosive charges 39 and 47 are disposed on the inside surfaces of the yokes 30 and 46, respectively, adjacent the edges of the satellite 26 for severing the yokes 30 and 46 after the rockets 35 and 36 are burned out. The explosive charges 39 and 47 are shaped so that the explosive force will be primarily directed through the yokes 30 and 46 and away from the satellite 26. The solar cells 52 are shielded from the effects of the explosive charges 39 and 47 by shields 48 and 49, made of a frangible material, such as balsa wood, disposed around the explosive charges 39 and 47.

The sixth stage rocket 36 is rotatably secured to the satellite 26 as well as being fastened to it by the yoke 46. As shown in FIGS. 4, 5, and 6, the satellite 26 is provided with a depression or well 53 in the face thereof adjacent the sixth stage rocket 36. The well 53 is stepped in diameter to provide a recess 54 at the outer extremity thereof. The sixth stage rocket 36 is provided with a cylindrical rim or extension 55, which extends into the recess 54. An annular ball bearing 56 disposed in the recess 54 encircles the outer wall of the extension 55 so that the satellite 26 will rotate freely with respect to the sixth stage rocket 36 after the yoke 46 has been severed.

An electric motor 57 is fastened to the sixth stage rocket 36 and extends through the inside of the extension 55 and into the well 53, being held therein by friction. A planetary gear train 58 is disposed within the sixth stage rocket 36 adjacent to the driving shaft of the motor 57 and is mechanically coupled thereto. Electrical connection to the motor 57 is made by a quick-disconnect contact arrangement 59 which extends through the bottom of the well 53 into the satellite 26. The contact arrangement 59 may be of any well-known type such as bifurcated springs, which engage contact pins. The arrangement for supplying power to the motor 57 will be described hereinafter. When the motor 57 is energized, the satellite 26 rotates with respect to the sixth stage rocket 36 in a direction opposite to the spin imparted thereto by the fourth stage rocket 34. At the bottom of the well 53 is an explosive charge 60 which, when ignited, forces the motor 57 and ball bearing 56 out of the well 53, thereby separating the sixth stage rocket 36 from the satellite 26.

Means is provided for making minor corrections in the orbital period, eccentricity, and phase of the satellite 26. Referring to FIGS. 4 and 5, a pair of guns 61 and 62 is disposed within the satellite 26 with their muzzles opening on two opposite faces of the satellite 26 in a plane perpendicular to the antenna axis and passing through the center of gravity of the satellite 26. The guns 61 and 62 are multiple-shot devices and, as may be seen in FIG. 7, may have four barrels 63. Each of the barrels 63 is of the same caliber but each is provided with a bullet or projectile 64 (FIG. 8) within it which has a different mass and a different charge of powder 65. Thus, each of the barrels 63, when fired, produces a different impulse.

The guns 61 and 62 are fired by the electrical ignition of a primer 66 in the rear of each of the barrels 63 through an electrical contact assembly 67 extending into the satellite 26 through the rear of the guns 61 and 62. Each of the barrels 63 may be fired independently of the others and the mass of the projectiles 64 and the charge of the powder 65 are selected so that impulse increments in a binary ratio of 1:2:4:8 may be obtained. Thus, if the smallest impulse is ⅛ pound-second (lb.-sec.), for example, any impulse in increments of ⅛ lb.-sec. from ⅛ to 1⅞ lb.-sec. may be obtained by firing selected combinations of barrels 63.

Figure 9:
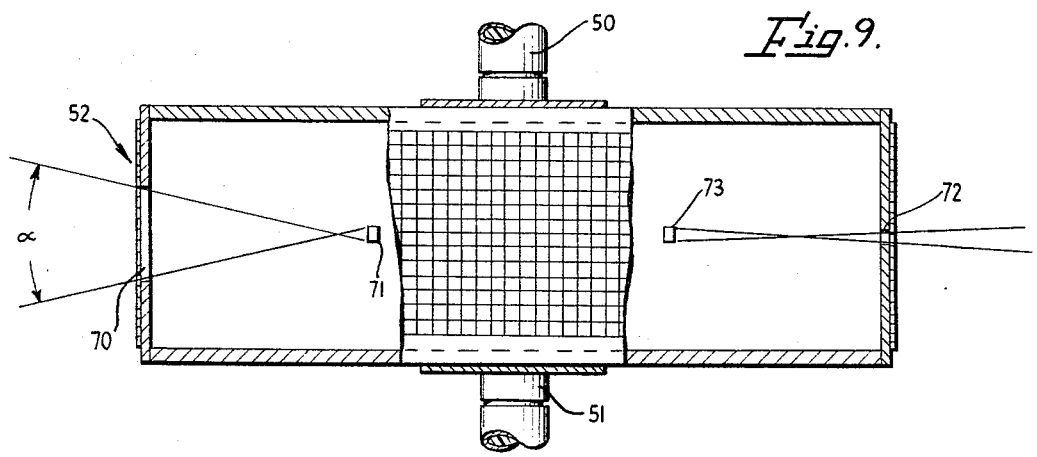
FIG. 9 is a detail view of the solar sensing arrangement.

The satellite 26 is also provided with means for sensing its orientation with respect to the sun. In FIG. 5, there is shown a slit 70 provided in the outer wall of the satellite 26 and extending parallel to the antenna axis. Referring to FIG. 9, a single orientation sensing solar cell 71 is disposed inside the satellite 26 adjacent the slit 70 so that when the sun is within the fan-shaped angular field of view designated as alpha ($\alpha$), the solar cell 71 is energized to develop a potential at its output terminals. Referring to FIG. 4, a second slit 72 is provided on the opposite face of the satellite 26 and which extends in a plane transverse to the plane of the first slit 70. Similarly, a second orientation sensing solar cell 73 (FIG. 9) disposed within the satellite 26 develops a potential when the sun is in the fan-shaped field of view of the second slit 72.

Miniature rockets 80 and 81 (FIG. 4) are secured to the satellite 26 at diagonally opposite corners thereof. The miniature rockets 80 and 81 may be of the type shown on page 389 of the referenced Rocket Encyclopedia and are oriented to direct their thrust in a plane perpendicular to the antenna axis which passes through the center of gravity of the satellite 26 and in a direction tangential to a radius line extending from the center of the satellite 26 to the rockets 80 and 81. The rockets 80 and 81 are provided with electrical igniters.

Figure 10:
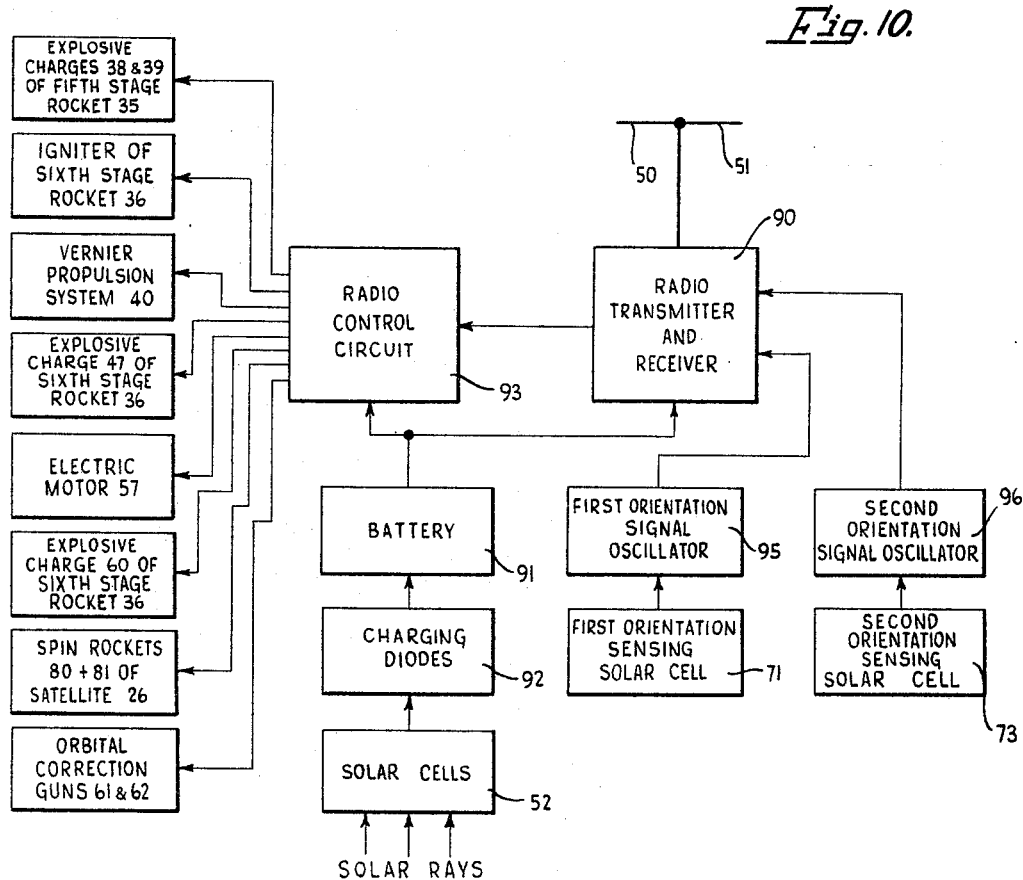
FIG. 10 is a diagram of the satellite control circuitry.

As will be seen in FIG. 10, the satellite 26 is provided with a radio transmitter and receiver 90 that is electrically connected to the antenna elements 50 and 51 as indicated. a source of potential, such as a storage battery 91, applies electrical power to the radio transmitter and receiver 90. The solar cells 52 disposed on the outer surface of the satellite 26 are connected through rectifiers or charging diodes 92 to the battery 91 to maintain it in a charged condition. Approximately 2200 solar cells 52 may be provided and are grouped into four banks, one bank on each face of the satellite 26 parallel to the antenna axis. The cells 52 in each bank are connected in a series-parallel arrangement, and although there may be different numbers of cells 52 in each bank, the number of cells in series in each series-parallel arrangement is the same to provide the proper voltage for the battery 91. The charging diodes 92 are nonconductive during periods that the voltage developed by any bank of cells 52 drops below that of the battery 91.

A radio control circuit 93 is also connected to the radio transmitter and receiver 90 and to the battery 91. The radio control circuit 93 is responsive to control signals received by the radio transmitter and receiver 90 for applying a potential from the battery 91 to the various electrically controlled devices associated with the satellite 26 and the fifth and sixth stage rockets 35 and 36. The particular radio remote control system utilized may be one of several systems well known in the art, for example, one utilizing subcarrier signals transmitted on a carrier wave. The radio control circuit 93 may, for example, include a number of filters for separating the various subcarrier signals and actuating relays in response thereto, as is well known in the art.

The explosive charge 38 for rupturing the combustion chamber of the fifth stage rocket 35 and likewise the explosive charge 39 for severing the yoke 30 connecting the fifth stage rocket 35 to the satellite 26, are individually connected to outputs of the radio control circuit 93. The igniter for the sixth stage rocket 36 is also connected to the radio control circuit 93. The control valve 42 of the vernier propulsion system 40 and the explosive charge 47 for severing the yoke 46 on the sixth stage rocket 36 are similarly separately connected to the radio control circuit 93. The electric motor 57 and the explosive charge 60 for separating the sixth stage rocket 36 from the satellite 26 are also connected to separate outputs of the radio control circuit 93. The miniature rockets 80 and 81 on the satellite 26 and the orbital correction guns 61 and 62 are in like fashion separately connected to the radio control circuit 93.

The first and second orientation sensing solar cells 71 and 73 are respectively connected to first and second orientation signal oscillators 95 and 96. The orientation sensing solar cells 71 and 73 supply electrical power for the oscillators 95 and 96 so that orientation signals are developed when the solar cells 71 and 73 are illuminated by the sun. The output signals from the oscillators 95 and 96 are applied to the radio transmitter and receiver 90 for transmission to a satellite control point (not shown). Thus, if the satellite 26 is spinning about the rocket axis and the sun is in the plane described or swept out by the antenna axis, a periodic signal will be developed by the second oscillator 96; but if the satellite 26 is spinning about the antenna axis and the sun is in the plane described or swept out by the rocket axis, a periodic signal will be developed by the first oscillator 95.

In the construction of the satellite 26, the mass of the units associated with the satellite 26 is accurately determined and the equipment is distributed within the satellite 26 so that the center of gravity is made to coincide with the center of the satellite 26; and the axis of maximum moment of inertia is made to coincide with the antenna axis.

Referring now to FIG. 11, the earth is represented by the circle designated 100 and is rotating in the counter-clockwise direction indicated by the arrow 101 around an axis represented as going into the drawing through the north pole 102. The rocket vehicle 25 is fired from a point 103 on the equator of the earth 100, which may be, for example, Jarvis Island in the Pacific Ocean. Prior to firing, the battery 91 is completely charged and the radio transmitter and receiver 90 and the radio control circuit 93 are placed in operation. After firing, the first four rockets 31–34 of the propulsion system 27 are automatically fired in sequence and guided by the guidance unit 28 and after burnout, each empty rocket case is jettisoned, as is well known in the art.

After the rocket vehicle 25 has attained considerable altitude, the rocket vehicle 25 is automatically turned in the direction of rotation of the earth 100 by the guidance unit 28, that is, in an easterly direction. Prior to separation of the third stage rocket 33 and ignition of the fourth stage rocket 34, the fourth stage rocket 34 has a spin about its longitudinal axis imparted to it at a rate of about 3 revolutions per second (r.p.s.) to provide spin stabilization, after which the heat shield 37 and the guidance unit 28 are automatically jettisoned. The multistage rocket power plant 27 propels the gross payload 29 to a point above the earth 100 near the lowest point or perigee 104 of an elliptical trajectory or transfer ellipse 105.

At this point, the gross payload 29 has attained an altitude of approximately 150 nautical miles and has a horizontal velocity, or velocity in a direction perpendicular to a line between the center of the earth 100 and the gross payload 29 of about 31,500 feet per second (f.p.s.). After burnout, the fourth stage rocket 34 is automatically jettisoned and the fifth stage rocket 35 is automatically fired to provide the additional thrust necessary to bring the velocity up to 33,500 f.p.s., causing the satellite 26 to reach the perigee 104 and to traverse the transfer ellipse 105. Because the velocity of the satellite 26 at the perigee 104 is quite critical in order to achieve the correct apogee, the velocity will be measured from the earth 100 in a well known manner, such as by means of a radio interferometer, for example. When the correct velocity has been attained, a radio control signal is transmitted from the earth 100 to the satellite 26 to fire the explosive charge 38 and rupture the combustion chamber of the fifth stage rocket 35 to reduce the thrust provided thereby to zero. The explosive charge 39 on the yoke 30 fires at the same time and separates the fifth stage rocket 35 from the satellite 26.

A first arrow 106, indicates the orientation of the sixth stage rocket 36 and the satellite 26 at the perigee 104 of the transfer ellipse 105, the arrow 106 pointing in the direction of thrust of the fifth stage rocket 35. Inasmuch as the satellite 26 is spin-stabilized about the rocket axis by the spin imparted by the spin nozzles or spin rockets (not shown) on the fourth stage rocket 34, the satellite 26 and the sixth stage rocket 36 maintains its attitude in space (arrows 107, 108, and 110) as it traverses the transfer ellipse 105 to the other side of the earth 100. As described hereinbefore the sixth stage rocket 36 is secured to the satellite 26 with an orientation such that it applies thrust in the direction opposite to that of the thrust of the fifth stage rocket 35.

At the highest point or apogee 109 of the transfer ellipse 105, the satellite 26 has attained the altitude of the desired circular 24-hour orbit 112 but is traveling at only 5200 f.p.s., which is less than that required for establishment of the satellite 26 in the orbit 112. A radio control signal is transmitted to the satellite 26 to cause ignition of the sixth stage rocket 36 to provide the additional velocity of 4890 f.p.s. to establish the satellite 26 into the circular orbit 112. At the apogee 109 on the other side of the earth 100 from the firing point 103, the direction of thrust of the sixth stage rocket 36 is such as to cause the satellite 26 to enter the circular orbit 112 due to the fact that the sixth stage rocket 36 has maintained its attitude in space while traversing the transfer ellipse 105 and due to the fact that the orientation of the sixth stage rocket 36 is opposite to that of the fifth stage rocket 35.

Inasmuch as the satellite 26 may have velocity and altitude errors, it only approximately enters the 24-hour stationary orbit 112, and corrections are made by radio control of the electrically controlled vernier propulsion system 40. The satellite 26 is tracked from the earth 100 by means of radio signals transmitted to the satellite 26 and relayed back to the earth 100 to determine the drift of the satellite 26 relative to the earth 100. The velocity of the satellite 26 is increased by opening the valve 42 of the vernier propulsion system 40 for controlled time intervals by means of radio control signals. Opening of the valve 42 results in jets of compressed nitrogen issuing from the nozzles 44 and 45 to provide a reaction force that increases the velocity of the satellite 26.

After the satellite 26 has been brought more accurately into the 24-hour orbit 112, a control signal is transmitted which results in the detonation of the explosive charge 47. This severs the yoke 46 so that the sixth stage rocket 36 is held to the satellite 26 only by the friction between the outside of the electric motor 57 and the bearing 56 and the sides of the well 53.

The satellite 26 is now spinning about the longitudinal axis of the sixth stage rocket 36 at a rate of about three r.p.s. due to the spin imparted to the fourth stage rocket 34 for stabilization as it travels in the orbit 112. The axis of spin is in the equatorial plane of the earth so that two times in each revolution of the satellite 26 about the rocket axis, the antenna axis, which will be the final spin axis, is parallel to the earth's axis 102 (FIG. 12). A control signal is transmitted to the satellite 26 which causes the motor 57 to be energized, thereby rotating the satellite 26 about the rocket axis with respect to the sixth stage rocket 36. The direction of rotation of the motor 57 is such that the satellite 26 rotates with respect to the rocket 36 in the opposite direction to the initial spin of the rocket 36. The speed of rotation of the motor 57 is such that the satellite 26 rotates with respect to the rocket 36 at a rate equal to the original spin rate of three r.p.s. multiplied by the ratio of the moment of inertia of the satellite 26 and the rocket 36 to the moment of inertia of the rocket 36, which may be 25 r.p.s., for example. Thus, the rate of spin of the satellite 26 about the rocket axis decreases as the angular momentum is transferred to the rocket 36. This is illustrated in FIG. 13.

The orientation of the antenna axis with respect to the earth's axis is determined from the earth 100 by means of the orientation signal developed by the second orientation oscillator 96 associated with the slit 72 transverse to the antenna axis. This determination can be made only during the time of day that the satellite 26 is in sunlight. However, in the equatorial orbit of the present example, only rarely does the earth 100 come between the sun and the satellite 26, and then only for intervals of short duration. As the satellite 26 slowly revolves around the rocket axis, the slit 72 periodically passes through sunlight. Thus, a periodic orientation signal is developed and transmitted to the earth 100 and the orientation of the antenna axis with respect to the earth's axis and the residual rate of rotation of the satellite 26 about the rocket axis may be determined.

At the instant that the antenna axis of the satellite 26 is parallel with the earth's axis 102 and the satellite 26 is only revolving very slowly about the rocket axis, the explosive charge 60 within the well 53 is detonated by means of a radio control signal transmitted to the satellite 26 from the earth 100. This separates the sixth stage rocket 36 from the satellite 26, as shown in FIG. 14. After separation, the satellite 26 is rotated about the antenna axis by electrically igniting the miniature rockets 80 and 81 by radio control from the earth 100.

Residual spin of the satellite 26 about the rocket axis at the time of ignition of the spin rockets 80 and 81 results in a nutating motion of the satellite 26 about the antenna axis. The spin velocity about the antenna axis is 2 r.p.s., which is much higher than the residual angular velocity about the initial spin axis and may be twenty times higher, for example. This comparatively high spin velocity about the antenna axis prevents the nutating motion from being very large.

As stated hereinbefore, the antenna axis of the satellite 26 is the axis of the maximum moment of inertia. This provides stability against the effects of vibration and associated energy loss that would otherwise tend to orient the spin around the axis of the largest moment of inertia if it were other than the antenna axis. In this way, the effects of such vibration are to cause the spin to stabilize about the desired axis, that is, to damp the nutation.

Deviations of the satellite 26 from the predetermined orbit 112 may be detected from the earth 100 and corrected by remote control. The satellite 26 is tracked from the earth 100, as previously mentioned, by means of radio signals transmitted to the satellite 26 and relayed back to the earth 100. Drift of the satellite 26 relative to the earth 100 and ellipticity of the orbit may be determined in this manner. When deviations are detected, calculations are made as to the proper direction in which a corrective force should be applied to the satellite 26 and as to the magnitude of the corrective force. The direction of the required corrective force is measured with respect to a reference direction which may be a line through the satellite 26 in the tangential direction of its travel around the orbit 112. This is illustrated in FIG. 16 where the arrow 116 represents the reference direction and the dotted arrow 115 represents the direction of the required corrective force at an angle phi ($\phi$) with respect to the reference direction.

The rotation of the satellite 26 around the antenna axis will cause the slit 70 parallel to the antenna axis to periodically pass through the sunlight. Thus, a periodic orientation signal is developed and transmitted to the earth 100 from which the instant that the guns 61 and 62 are oriented in the direction to apply a reactive force in the direction of the required corrective force may be predicted. Knowing the required magnitude of the corrective force, particular ones of the barrels 63 may be selected for firing. The reactive force developed by the guns 61 and 62 is equal to the mass of the bullet 64 plus a fraction of the charge multiplied by the muzzle velocity. This impulse can be applied in any direction normal to the antenna axis without causing nutations because the barrels 63 are in the plane normal to the spin axis containing the center of gravity of the satellite 26. The guns 61 and 62 are fired at the proper instant by transmitting a control signal from the earth 100, making due allowance for the transit time of radio signals between the earth 100 and the satellite 26.

By this means, the satellite 26 is made to orbit around the earth 100 with the same angular velocity as the earth 100 and in the same direction of rotation. The antenna axis is parallel to the axis of rotation of the earth 100 so that the antenna elements 50 and 51 radiate signals to the earth 100 in a narrow beam and the solar cells 52 are oriented to receive optimum light from the sun.

It will be apparent that because of the rotation of the satellite 26 about the antenna axis, not all of the solar cells 52 are exposed to the sun at any one time. However, the rectangular configuration of the satellite 26 provides an optimum average area of exposure of the solar cells 52 to the sun. The total area of the solar cells 52 may be about 5.8 square feet, for example. The minimum average projected area of exposure of the solar cells 52 to the sun, which occurs at the summer and winter solstices, may be on the order of 1.7 square feet, for example.

It will be recognized that although guns 61 and 62 which fire a projectile 64 from the satellite 26 have been disclosed as an example of means for applying a force to the satellite 26 for correction of the orbit, other means may be utilized. For example, a charge of powder may be detonated on the space vehicle to apply a force to the satellite. Further, jets of compressed gas could be utilized, if desired.

As to the disclosed means for sensing the orientation of the satellite 26, namely, the slits 70 and 72, orientation sensing solar cells 71 and 73, and the orientation oscillators 95 and 96, it will be understood that other means may be provided. For example, asymmetry may be deliberately introduced into the antenna radiation pattern of the satellite 26.

Thus, there has been described a method and apparatus for launching a satellite into a particular orbit, and with a predetermined orientation with respect to the earth, to provide optimum antenna gain and optimum solar cell illumination. By using simple spin-stabilization to orient the satellite, the weight and complexity of the satellite have been minimized. A method and apparatus has been described for stopping the spin of a space vehicle such as a satellite about a first axis and spinning the satellite about a new axis perpendicular to the first axis. Further, a method and apparatus has been described for correcting the orbit of a spin-stabilized satellite.

While only one embodiment of the invention has been shown and described, modifications may be made, and it is intended in the appended claims to cover all such modifications as may fall within the true spirit and scope of the invention.

What is claimed is:

1. Apparatus for changing the linear velocity of a spinning body traversing a path comprising: a body adapted to traverse a path with a predetermined linear velocity and adapted to spin about an axis extending through the center thereof transverse to said path; means disposed in said body for developing a periodic orientation signal synchronized with the spin of said body; means disposed within said body and electrically connected to said last-named means for transmitting said orientation signal to a control point; means disposed in said body for receiving control signals from the control point; and means disposed within said body and coupled to said last-named means for applying impulses of a predetermined magnitude to said body during a predetermined portion of the spin cycle of said body about said axis and in a direction along a line normal to said axis that passes through the center of gravity of said body.

2. Apparatus for changing the linear velocity of a spinning body traversing a path comprising: a body adapted to traverse a path with a predetermined linear velocity and adapted to spin about an axis extending through the center thereof transverse to said path; means disposed in said body for developing a periodic orientation signal synchronized with the spin of said body; control means electrically coupled to said last-named means for developing control signals in response to said orientation signal; and means disposed within said body and coupled to said last-named means for applying impulses of a predetermined magnitude to said body during a predetermined portion of the spin cycle of said body about said axis and in a direction along a line normal to said axis that passes through the center of gravity of said body.

References Cited

UNITED STATES PATENTS

| | | | |
|---|---|---|---|
| 1,102,653 | 7/1914 | Goddard | 102—51 |
| 1,290,275 | 1/1919 | Meilicke | 102—69 |
| 2,329,414 | 9/1943 | Nelson | 102—9 |
| 2,649,262 | 8/1953 | Fahrney | 244—14.5 |
| 2,711,295 | 6/1955 | Peterson | 170—135.71 X |
| 2,763,447 | 9/1956 | Carrau | 102—9 |
| 2,822,755 | 2/1958 | Edwards et al. | 102—49 |
| 2,835,548 | 5/1958 | Baumann | 244—1 |
| 2,974,902 | 3/1961 | Schofer | 244—17.19 |

OTHER REFERENCES

"Navigation By Satellites," Missiles and Rockets, Act. 1956, pp. 48, 49, 50, 51, and 52.

Aviation Week, June 22, 1959, p. 189, copy in Division 22.

FERGUS S. MIDDLETON, *Primary Examiner.*

Disclaimer 3,396,920.—*Harold A. Rosen*, Santa Monica, and *Donald D. Williams*, Inglewood, Calif. APPARATUS FOR CHANGING THE ORIENTATION AND VELOCITY OF A SPINNING BODY TRAVERSING A PATH. Patent dated Aug. 13, 1968. Disclaimer filed Apr. 19, 1977, by the assignee, *National Aeronautics and Space Administration*.

Hereby enters this disclaimer to all claims of said patent.

[*Official Gazette September 20, 1977.*]